United States Patent

[11] 3,623,576

| [72] | Inventors | Richard C. Waring<br>Pittsburg, Calif.;<br>Earle B. Williams, Everett, Wash.; Loren<br>H. Williams, Sacramento, Calif. |
|---|---|---|
| [21] | Appl. No. | 843,988 |
| [22] | Filed | July 23, 1969 |
| [45] | Patented | Nov. 30, 1971 |
| [73] | Assignee | Inventors Associates<br>Pittsburg, Calif. |

[54] COOLING SYSTEM FOR WHEELS AND BRAKES OF AIRPLANE LANDING GEAR
26 Claims, 14 Drawing Figs.

[52] U.S. Cl. .................................................. 188/71.6,
188/264 AA, 192/113 A
[51] Int. Cl. .................................................. F16d 65/84
[50] Field of Search .................................................. 188/264 R,
264 A, 264 AA, 71.6; 192/113 R, 113 A

[56] References Cited
UNITED STATES PATENTS

| 3,217,844 | 11/1965 | Nelson et al. ............ | 188/264 P |
|---|---|---|---|
| 3,347,344 | 10/1967 | Troy ............................ | 188/264 |

FOREIGN PATENTS

| 922,633 | 2/1952 | Germany ..................... | 188/264 |

Primary Examiner—George E. A. Halvosa
Attorney—Bernard Kriegel

ABSTRACT: A cooled wheel and brake assembly in which a container for a coolant is combined with the assembly, a gaseous coolant being discharged through expansion chambers to cool the wheel assembly, the coolant discharge being under the control of valves which are operated by heat-responsive actuators, the coolant being released into the expansion chambers on demand.

PATENTED NOV 30 1971 3,623,576

INVENTORS.
RICHARD C. WARING
EARLE B. WILLIAMS
LOREN H. WILLIAMS

By Bernard Kriegel
ATTORNEY.

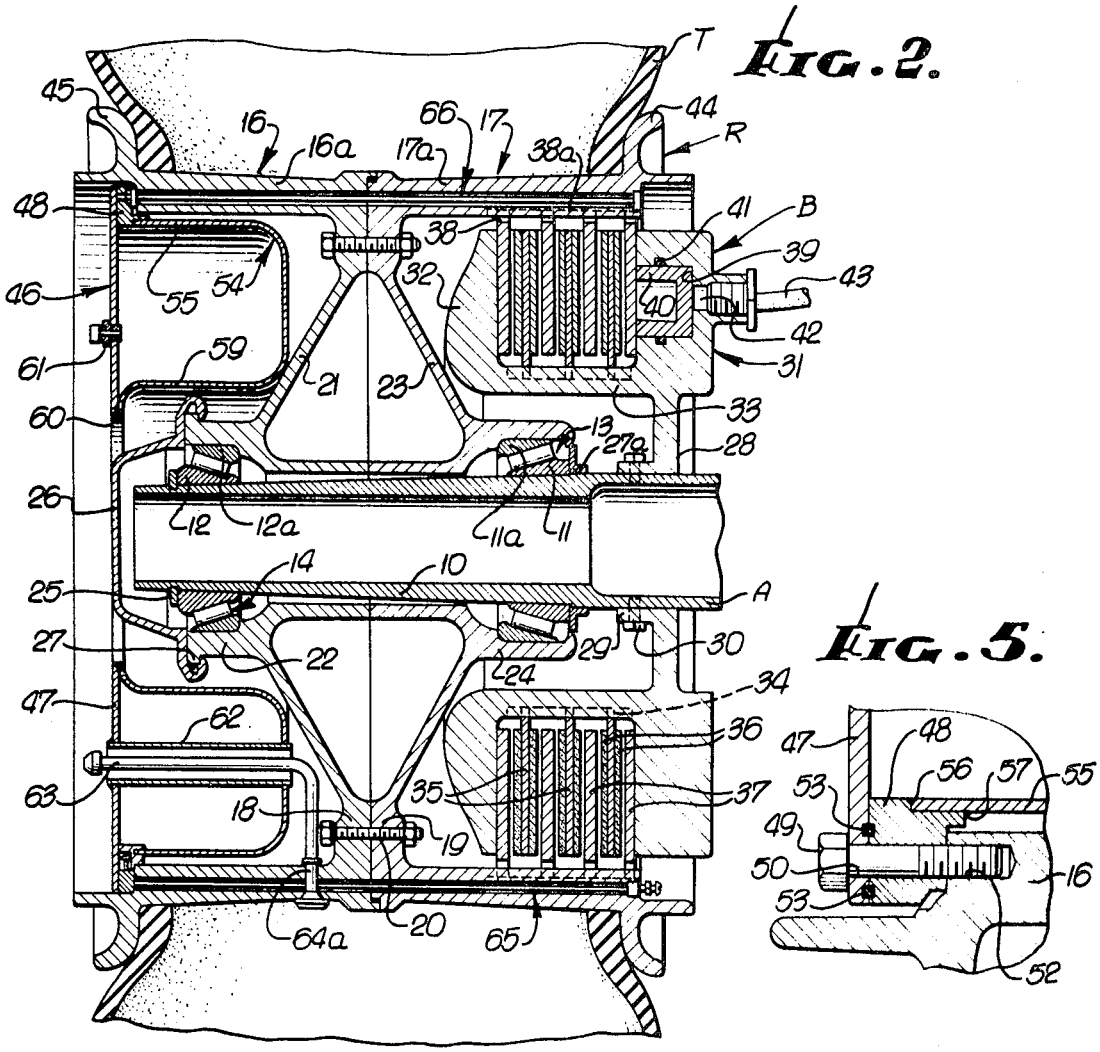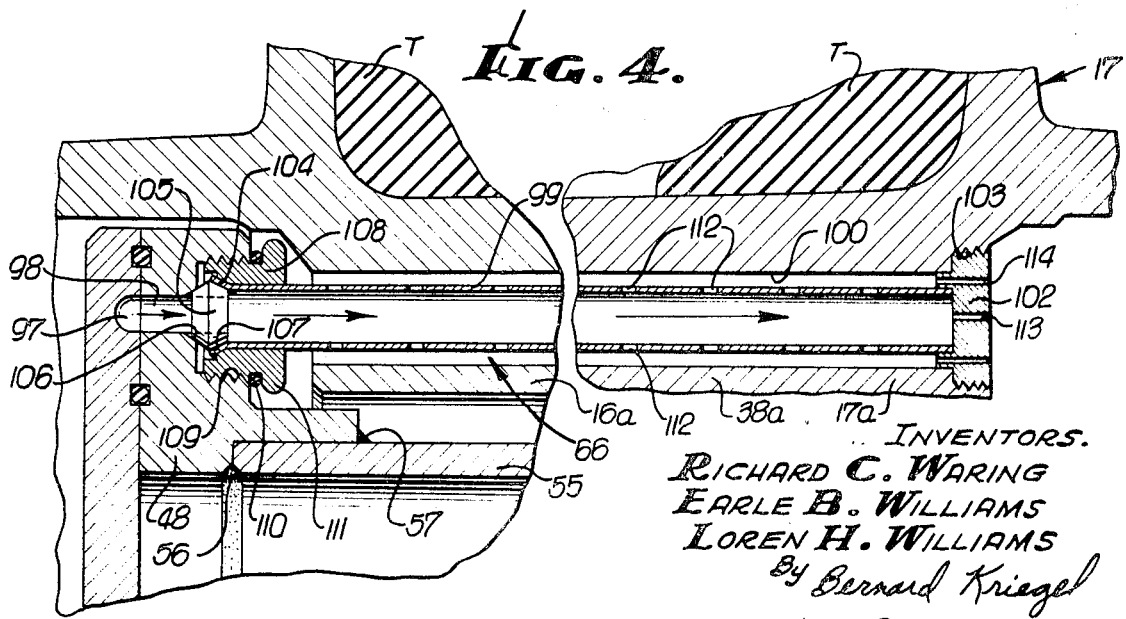

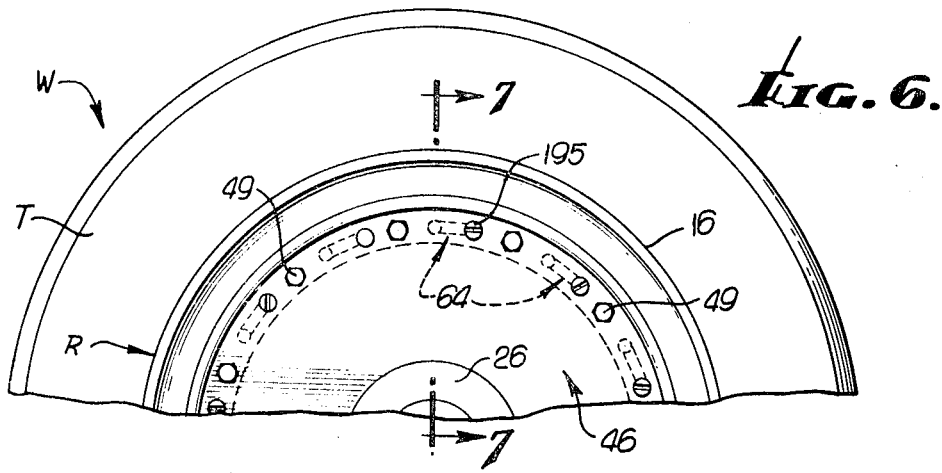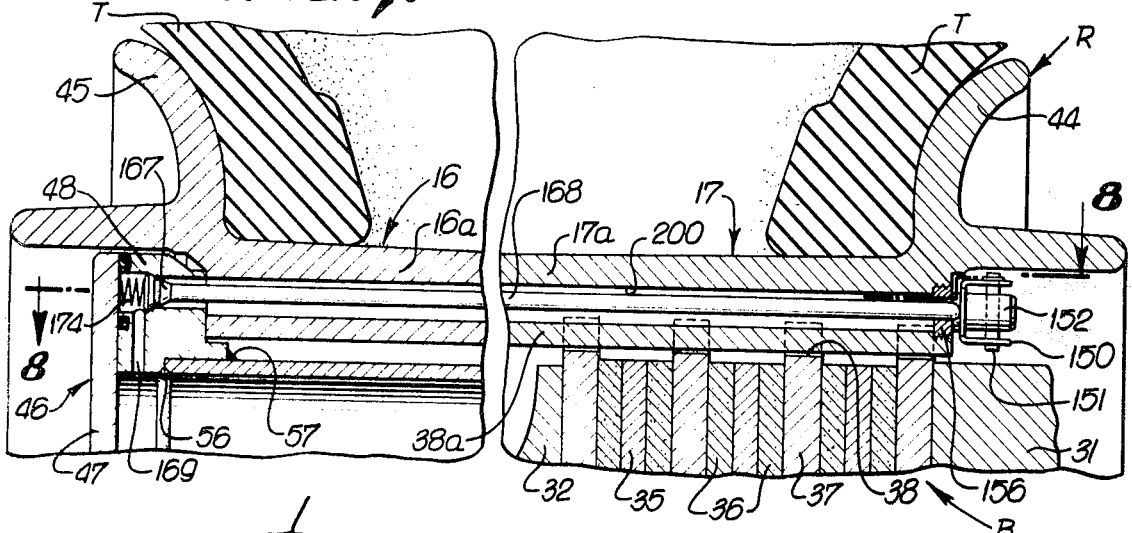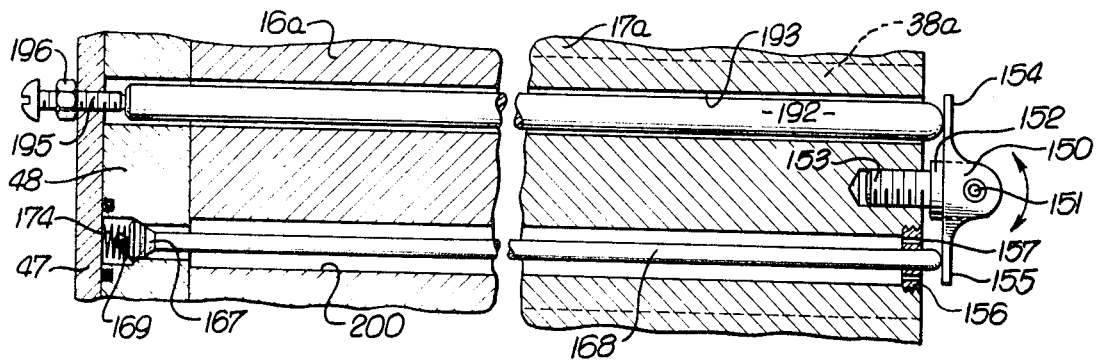

INVENTORS.
RICHARD C. WARING
EARLE B. WILLIAMS
LOREN H. WILLIAMS
By Bernard Kriegel
ATTORNEY.

INVENTORS.
RICHARD C. WARING
EARLE B. WILLIAMS
LOREN H. WILLIAMS
By Bernard Kriegel
ATTORNEY.

COOLING SYSTEM FOR WHEELS AND BRAKES OF AIRPLANE LANDING GEAR

The stopping of aircraft, which lands at relatively high speeds, is accomplished to a great extent by friction brakes that generate substantial heat. Such heat is transferred from the brake assembly to the rim of the aircraft wheel and to the tire thereon, oftentimes resulting in tire failure. Such brake assemblies generally comprise a stator associated with the wheel axle and a rotor, the stator and the rotor having cooperatively engageable friction discs adapted to be pressure loaded together, substantial heat being transmitted both indirectly and directly from the rotor discs to the wheel rim. While such brake assemblies have heretofore been constructed so as to dissipate a large amount of the heat generated during brake operation, generation of excessive heat has continued to pose problems both from the standpoint of deterioration of brake discs and from the standpoint of overheating of the wheel assembly, including the tire thereon.

The present invention involves the controlled application of a cooling effect to the wheel and brake assembly to prevent the overheating of the wheel and the resulting overheating of the tire thereon.

More particularly, the present invention provides a cooled wheel assembly wherein a coolant, such as pressurized carbon dioxide or Freon, is released through expansion chambers provided in the wheel assembly under the control of thermally sensitive valve means, so that the brake discs and/or the wheel rim are effectively cooled when the heat of the braking friction requires the assembly to be cooled.

In accomplishing the foregoing, the present invention provides a coolant tank or reservoir incorporated in the wheel structure, and adapted to be filled with a coolant under pressure, such as carbon dioxide or Freon, for example, valves being provided for allowing the controlled discharge of the coolant from the reservoir into expansion chambers spaced circumferentially of the wheel assembly, the valves being actuatable by thermal-responsive means, such as heat-sensitive actuator rods, having a high coefficient of expansion, and which respond to heat to open the normally closed valves and allow the controlled expansion of the coolant in the expansion chambers. The exhaust coolant may be discharged from the wheel assembly directly or indirectly. In the former case, the coolant is discharged into the region of the friction discs themselves so as to effectively cool the latter.

This invention possesses many other advantages, and has other purposes which may be made more clearly apparent from a consideration of several forms in which is may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 2 is an enlarged fragmentary vertical section taken on the line 2—2 of FIG. 1;

FIG. 4 is an enlarged fragmentary detail section taken on the line 4—4 of FIG. 1, showing one form of expansion chamber;

FIG. 5 is an enlarged fragmentary sectional view taken on the line 5—5 of FIG. 1;

FIG. 6 is a fragmentary side elevation of another wheel assembly embodying another form of the invention;

FIG. 7 is an enlarged fragmentary detailed section taken on the line 7—7 of FIG. 6, showing another form of valve means;

FIG. 8 is a view in section taken on the line 8—8 of FIG. 7;

Figure 1:
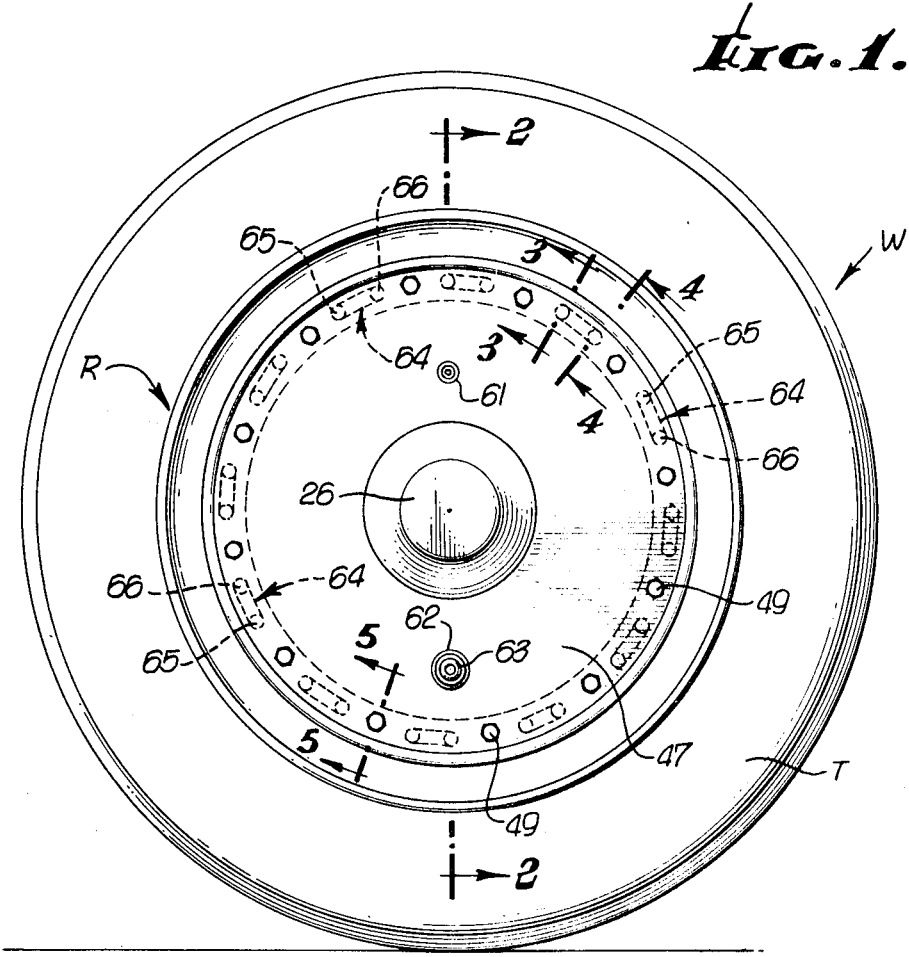
FIG. 1 is a side elevation of a wheel and brake assembly embodying the invention.

Referring to FIGS. 1 through 5, an illustrative embodiment of the invention is shown as being incorporated in a wheel assembly W, including a wheel R supported on an axle A and including brake means B, whereby rotation of the wheel R on the axle A may be arrested. As best seen in FIG. 2, the axle A may be a hollow axle having a tapered portion 10 on which are mounted the inner races 11 and 12 of roller bearing assemblies 13 and 14, respectively, the outer races 11a and 12a of which are carried within the hub portions 24, 22 of the wheel R. In the wheel structure herein illustrated, the assembly comprises an outboard section 16 and an inboard section 17 having opposing flanges 18 and 19 adapted to be secured in abutting relation by bolts 20, or other suitable fasteners. The outboard wheel section 16 has an outwardly extending disc or center portion 21 which flares downwardly toward the axle A and which is provided with the cylindrical hub portion 22. Correspondingly, the wheel section 17 has an inwardly extended center portion 23 provided with the hub portion 24 which contains the bearing race 11a of the bearing assembly 13. The outboard bearing assembly 14 is suitably retained on the axle A by a retainer ring 25 so as to hold the rim assembly R fixed against axial displacement on the axle A, a cap 26 being affixed to a peripheral flange 27 of the hub portion 22 of the outboard section 16 to prevent the entry of foreign matter. At the inboard side of the assembly R, a suitable dust seal 27a is provided to prevent entry of foreign matter into the inboard bearing assembly 13.

The center disc 23 and hub 24 of the inboard section 17 provide a space in which part of the brake assembly B is accommodated. This assembly B includes a central supporting disc 28 having a hub 29 secured by fasteners 30 to the axle A so as to be stationary therewith. On the disc 28 is the body 31 of the brake stator, this body 31 including an annular portion 32 projecting outwardly from a cylindrical body section 33. Disposed about the cylindrical section 33 and splined thereto, as at 34, are a number of stator brake discs 35 having suitable friction lining pads 36 thereon. Cooperative rotor discs or plates 37 are splined, as at 38, on longitudinally extended cleats 38a formed within the rim 17a of the section 17, the discs 35 and 37 being alternately arranged for coengagement with one another in response to the application of an axial clamping force thereon. To apply such force, the stator body 31 is provided with one or more cylinders 39, each containing a piston 40 engageable with an outer brake disc 37. A suitable side seal 41 in the cylinder 39 slidably seals against the piston 40, so that fluid under pressure may be admitted through a conduit 43 and a port 42 to shift the piston 40 toward the stator flange 32, pressing the brake discs 35 and 37 therebetween when the brake is applied.

When the brake is employed to stop a fast landing aircraft, for example, the heat generated by the sliding frictional engagement between the pads 36 and disc 37 is very substantial. Such heat is radiated to the wheel assembly indirectly, as well as directly, at the splined connections 38 between the plates or discs 37 and the wheel section 17a. As a consequence, there is a tendency to overheat the pneumatic tire T mounted upon the wheel rim 16a, 17a between the usual tire supporting flanges 44 and 45.

Accordingly, the present invention involves cooling the wheel and its brake to dissipate the heat of friction generated by the brake means B.

In the illustrative embodiment of FIGS. 1 to 5, the wheel rim is cooled by the expansion of a compressed or liquified gas, such as carbon dioxide or Freon, for example. Thus, a tank or reservoir 46 containing the coolant supply is disposed in the space between the outboard rim section 16a, hub 22 and the center portion 21. The tank or reservoir 46 is annular in form and includes an outer wall 47 and a support rim 48 which are secured together and fastened to the outboard rim section 16a by a suitable number of screw fasteners 49 spaced circumferentially around the assembly, as seen in FIG. 1, and which extend through openings 50 in the outer wall 47 of the reservoir into threaded bores 52 in the rim section 16a, as seen in FIG. 5. Suitable inner and outer O-ring seals 53, 53 are disposed at the interface of the reservoir wall 47 and support ring 48, these O-rings extending circumferentially around the wheel axis, with the fasteners 49 extending between the O-rings 53. The tank or reservoir 46 also includes an annular body or shell 54 having an outer sidewall 55 welded or soldered to the support ring 48, as at 56 and 57. The inner sidewall 59 of the shell 54 is welded or soldered to the end wall 47, as at 60. Thus, there is provided a reservoir or tank 46 of annular form adapted to nest within the space between the rim section 16a and its hub flange 22. A suitable filler plug 61 is provided in the wall 47 to permit the reservoir 46 to be filled with a pressurized coolant gas.

As seen in FIG. 2, a tube 62 is provided through one portion of the reservoir or tank 46 and through which a valved conduit 63 extends which is connected to and extends through the rim section 16a, as at 64a. Essentially, the valved conduit 63 is used for inflating the tire T.

Figure 3:
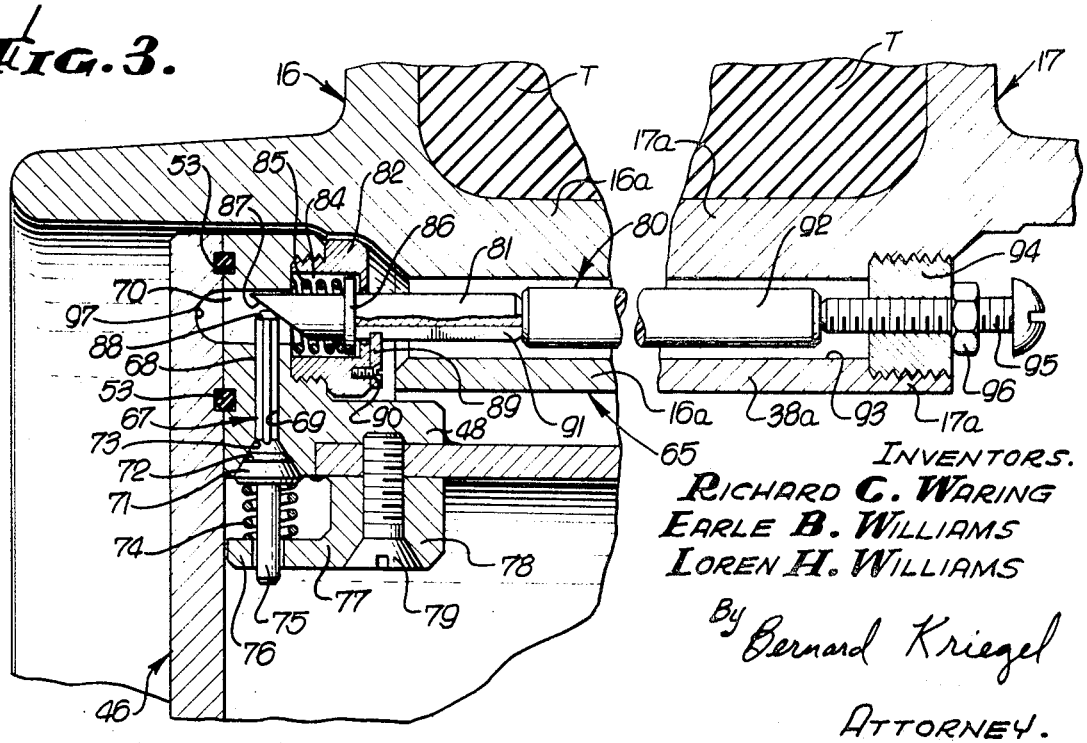
FIG. 3 is an enlarged fragmentary detail section taken on the line 3—3 of FIG. 1, showing one form of valve means.

Referring to FIG. 1, a plurality of circumferentially spaced coolant devices 64 are provided. Each device 64 includes a heat-responsive valve mechanism 65 and an expansion chamber 66 under the control of the valve mechanism 65 whereby the coolant gas is allowed to escape and expand from the tank or reservoir 46 through the respective expansion chambers to cool the wheel and brake assembly. As seen in FIG. 3, each of the valve mechanisms 65 comprises a poppet valve 67, including a longitudinally ribbed stem 68, which is reciprocable in a bore 69 constituting a valve passage and extending radially in the support ring 48 between the tank or reservoir 46 and a valve discharge chamber 70 formed in the support ring 48 between the O-rings 53. Each poppet valve 67 also includes a conical head 71 having a seal ring 72 adapted for seating engagement in a conical valve seat 73. A valve spring 74 is disposed about a stem section 75 of the valve 67 and is interposed between a spring seat 76 and the head 71 of the poppet valve to normally bias the valve to a closed position. The spring seat 76 is provided by a flange 77 projecting from a bracket 78 secured by suitable fasteners 79 extending into the support ring 48.

Thermal responsive actuators 80 are provided for forcing the valve 67 off its seat. This actuator 80 comprises an actuator stem 81 reciprocably disposed in a plug 82 threaded into the support ring 48 and containing a spring chamber 84. A coiled compression spring 85 in the chamber 84 abuts at one end against the support member 48 and at its other end on a flange 86 of the stem 81 within the spring chamber 84. The stem 81 has an inclined end or cam face 87 engageable with the conical tip 88 of the stem 68 of the poppet valve 67. The operative relation between the inclined face 87 and the valve tip 88 is maintained by a key 89 affixed to the plug 82 by a suitable fastener 90 and extending into a longitudinally extended keyway 91 in the actuator stem 81. The spring 85 normally acts on the actuator stem 81 to bias the same in a direction which allows the spring 74 to seat the poppet valve against the valve seat 73.

The thermal responsive actuator means 80 includes a rod 92 extending longitudinally within a bore 93 extending through both of the wheel rim sections 16a and 17a, the bore being closed at the inboard side of the rim section 17a by a threaded plug 94. This plug 94 threadedly supports an adjuster screw 95 which extends into the bore 93 for engagement with the end of the rod 92. Thus, the adjuster screw 95 is adapted to adjust the normal position of the rod 92 and the actuator stem 81 with respect to the poppet valve 67, so as to assure the desired expansion. A locknut 96 is threaded on the adjuster screw 95 to secure the adjuster screw in its desired condition of adjustment. The rod 92 is composed of a suitable material having a high coefficient of thermal expansion, and, therefore, having a tendency to elongate substantially when subjected to high temperatures, but to correspondingly contract when cooled. The material, for example, may be Delrin.

Each valve discharge chamber 70 communicates through a port or passage 97 with the expansion chamber means 66, previously referred to, and which is disclosed in FIG. 4. This passage 97 leads to a port 98 in the support ring 48, which communicates with an elongate tube 99 disposed in a bore 100 extending completely through the rim sections 16a and 17a. At one end, the tube 99 is supported in a plug 102 threaded in a bore 103 in the rim section 17a. At its other end, the tube 99 is sealingly engaged, as at 104, with a ferrule 105 clamped between a conical face 106 in the support ring 48 and an opposing conical face 107 in a threaded plug 108 engaged in threaded bore 109 in the support ring 48. A seal ring 110 may be interposed between a flange 111 of the plug 108 and the opposing face of the support ring 48.

Spaced longitudinally along the expansion tube 99 are a suitable number of radial ports 112 which establish communication between the tube 99 and the bore 100 in the rim sections 16a and 17a. In addition, the plug 102 is provided with an exhaut port 113 leading from the inside of the tube 99 and with a suitable number of circumferentially spaced exhaust ports 114 leading from the bore 100, the ports 113, 114 permitting expanded gas to exhaust to atmosphere.

It will now be apparent that coolant stored in the tank or reservoir 46 discharges through the valve chamber 70, when the valve 67 is open, into the passage 97, flowing into the tube 99 and the bore 100, where the expansion of the coolant gas effects a considerable reduction in its temperature, thereby cooling the cleats 38a and the rim sections 16a and 17a. In addition, the cooling effect will be transmitted by conduction to the rotor discs 37 through the splined connections 38. The cooling effect is realized on demand when the brake means B are applied, since the heat of friction generated by the braking action will effect expansion of the highly expandable rod 92, which will shift the poppet valve 67 off its seat, allowing the discharge of coolant from the tank or reservoir 46 into the expansion means 66. As the cooling effect reduces the heat in the brake and wheel assemblies, the rod 92 will contract, allowing the poppet valve 67 to be closed by the spring 74. The cooling action takes place around the circumference of the wheel because of the provision of spaced sets of coolant devices 64.

A modified construction is illustrated in FIGS. 6 to 8, inclusive. In this embodiment, the wheel rim assembly R and the brake assembly B are the same as in the previously described embodiment. In addition, the tank and reservoir structure 46 and its mode of connection with the rotor would also be the same. However, the arrangement of the valve means and the coolant expansion chamber of the respective coolant devices 64 have been modified. In this embodiment, the rim sections 16a and 17a have a plurality of sets of bores 193 and 200 disposed in circumferentially spaced relation. Each of the bores 193 has disposed therein a thermally responsive rod 192 having a high coefficient of expansion, and each of the bores 200 has an elongate valve stem 168 reciprocable therein. At one end of the bore 193, an adjuster screw 195 is engaged with the adjacent end of the expansion rod 192, and a locknut 196 is threaded on the adjuster screw 195 to secure it in adjusted position. At its other end, the rod 192 engages a rocker arm 150, which is pivotally mounted on a pivot pin 151 carried on a post 152 having threaded stem 153 threadedly engaged in the rim section 17a. The rocker arm 150 has one arm 154 engaged with the expandable rod 192 and its other arm 155 engaged with the valve stem 168. The valve stem 168 extends through a ported plug 156 having vent ports 157 exhausting to atmosphere. At its other end, the valve stem 168 has a conical valve head 167, a spring 174 acting on the valve head 167 to normally bias the same to a closed position. The support ring 48 of the tank or reservoir structure has a port 169 leading into the valve chamber in which the spring 174 is disposed.

It sill now be apparent that operation of the embodiment now being described involves elongation of the rod 192 in response to thermal expansion. Such elongation will rock the rocker arm 150 in a clockwise direction, as viewed in FIG. 8, thereby unseating the valve head 167. When the valve is open, coolant gas will flow into and expand into the bore 200 to effect a cooling action, the gas escaping to the atmosphere through the vent ports 157. Thus, as in the previously described embodiment, the rim sections 16a and 17a, and the cleats 38a, will be cooled, the cooling effect being conducted to the rotor brake discs 37 and to other adjacent parts. When sufficient cooling occurs, the expansion rods 192 contract and allow the valve to be closed by the springs 174.

Figure 9:
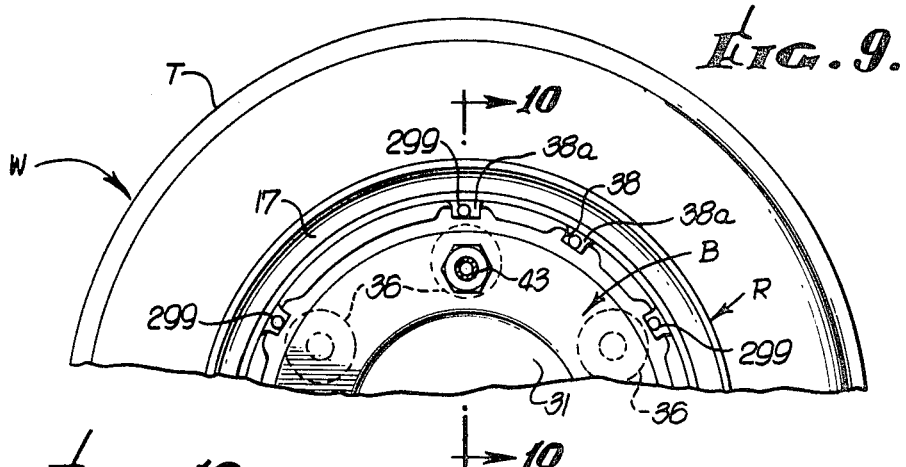
FIG. 9 is a fragmentary view in side elevation showing still another wheel assembly embodying another specific form of the invention.
Figure 10:
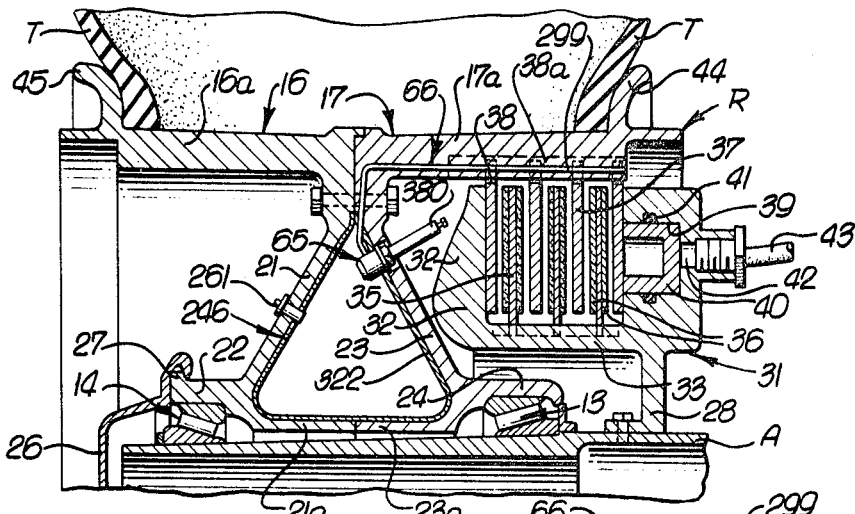
FIG. 10 is an enlarged fragmentary section taken on the line 10—10 of FIG. 9.
Figure 11:
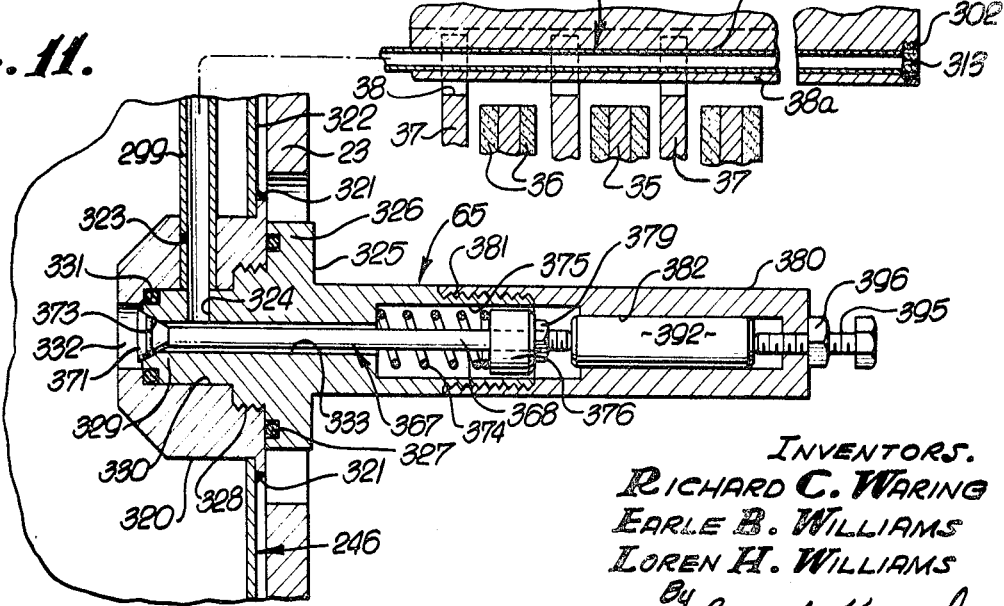
FIG. 11 is an enlarged fragmentary view illustrating the valve actuator and expansion chamber of FIG. 10.

A further modification of the invention is illustrated in FIGS. 9 to 11, inclusive. In this embodiment, the rim assembly R and the brake assembly B are the same as in the first-described embodiments. However, in the present form of the invention, the tank or reservoir 246 is generally triangular in section and annular in form, so as to fit within the triangular annular space defined between the center portions 21 and 23 and abutting cylindrical hub portions 21a and 23a of the wheel sections 16 and 17. A filler plug 261 is provided in the disc portion 21, which opens into the reservoir 246 to enable the latter to be filled with the refrigerant.

The expansion chamber device 66 in the present embodiment extend through the rim sections 17a and thence through the cleats 38a of the splined connections 38, circumferentially spaced expansion tubes 299 being installed prior to assembly of the rim structure. At its outer extremity, each tube 299 is closed by a ported plug 302 having a suitable number of exhaust ports 313 for allowing the escape of gas from the tube to the atmosphere.

The valve mechanism 65 of this embodiment includes a supporting base 320 welded or soldered, as at 321, or otherwise suitably secured, within the sidewall 322 of the reservoir or tank 246. The expansion conduit 299 extends into an opening 323 in the base 320 for communication with a valve outlet port 324 provided in a valve body 325. This valve body 325 has a flange 326 provided with a face seal 327 for engagement with the supporting base 320 upon threading of a threaded section 328 of the body into the base 320. A cylindrical extension 329 of the valve body 325 extends into a bore 330 in the base 320 and is provided with a suitable seal ring 331 sealingly engaging the base of the bore 330. The supporting base has an inlet port 332 providing communication between the tank or reservoir 246 and a valve passage 333 which extends longitudinally of the valve body 325, and is intersected by the valve outlet port 324.

A poppet valve 367 has a stem reciprocable in the passage 333 and a head 371 engageable with a conical seat 373 on the valve body 325. A helical compression spring 374 is disposed in a bore 375 in the valve body 325, the spring 374 seating at one end against the bottom of the bore 375 and at its other end against a spring seat or stop collar 376 disposed upon the stem 368 and secured in a selected adjusted position by a locknut 379.

An actuator body 380 is threadedly connected, as at 381, to the valve body 325, having a bore 382 in which is disposed the thermal-responsive rod 392 having a high coefficient of expansion. The rod 392 engages the valve stem 368 at one end and an adjuster screw 395 at its other end threaded into the end wall of the body 380. A locknut 396 is threaded on the screw 395, bearing against the body to secure the adjuster screw 395 in a selected position of adjustment.

It will now be understood that, in the embodiment of FIGS. 9 through 11, the heat sensing valve mechanism 65 is not disposed in the splined connections between the wheel R and the rotor discs 37, but, instead, it is disposed in close proximity to the brake assembly so as to be sensitive to the heat generated thereby. When the heat reaches a point at which the circumferentially spaced rods 392 expand to unseat the valve heads 371, the coolant gas will flow into the expansion tubes 299 so as to apply cooling to the cleats 38a of the splined connection 38 and to the rim assembly to cool the brake B and the rim, as well as other adjacent parts. When sufficient cooling occurs by a drop in temperature around the actuator bodies 380, the Delrin rods 392 contract sufficiently to allow the springs 374 to close the valves.

Figure 12:
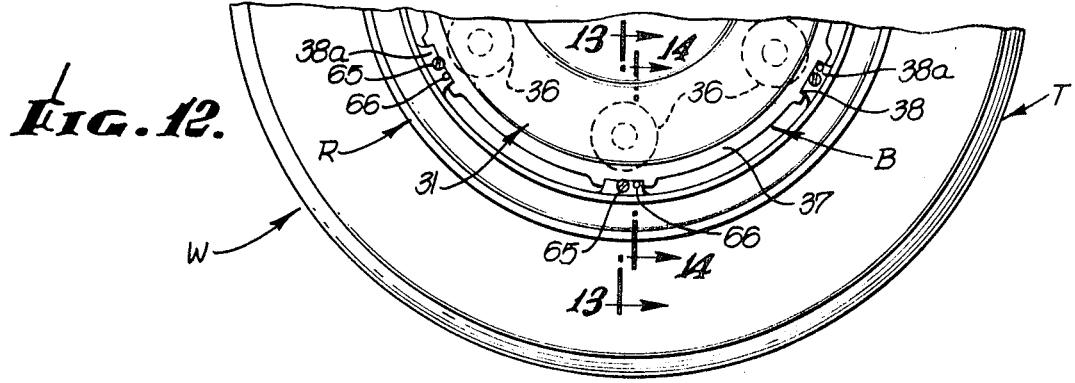
FIG. 12 is a fragmentary side elevation of still another wheel assembly embodying the invention.
Figure 13:
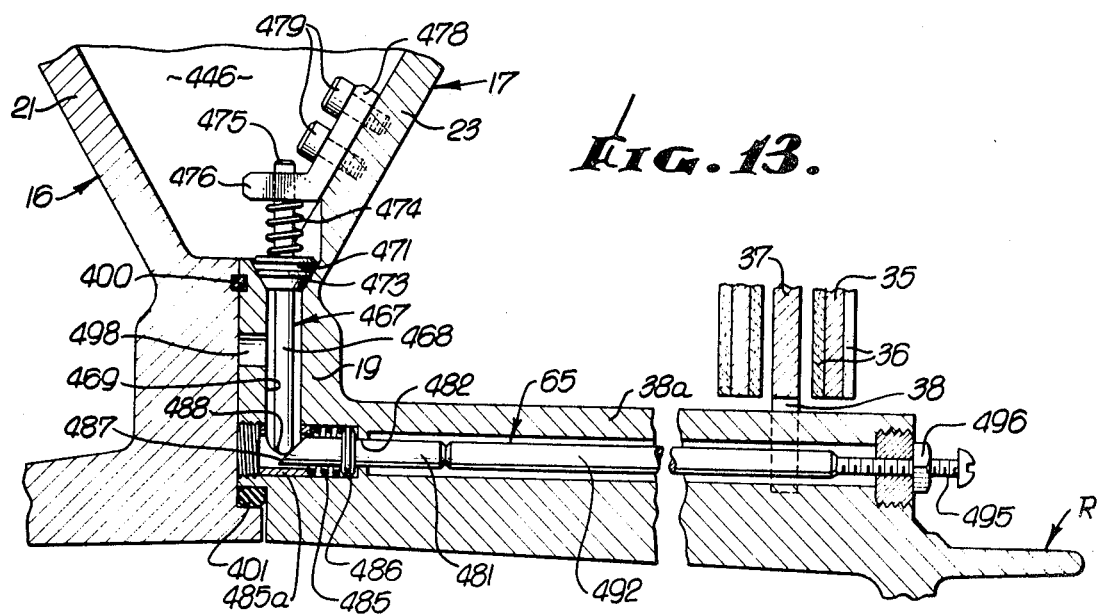
FIG. 13 is an enlarged fragmentary section taken on the line 13—13 of FIG. 12, showing the valve means.
Figure 14:
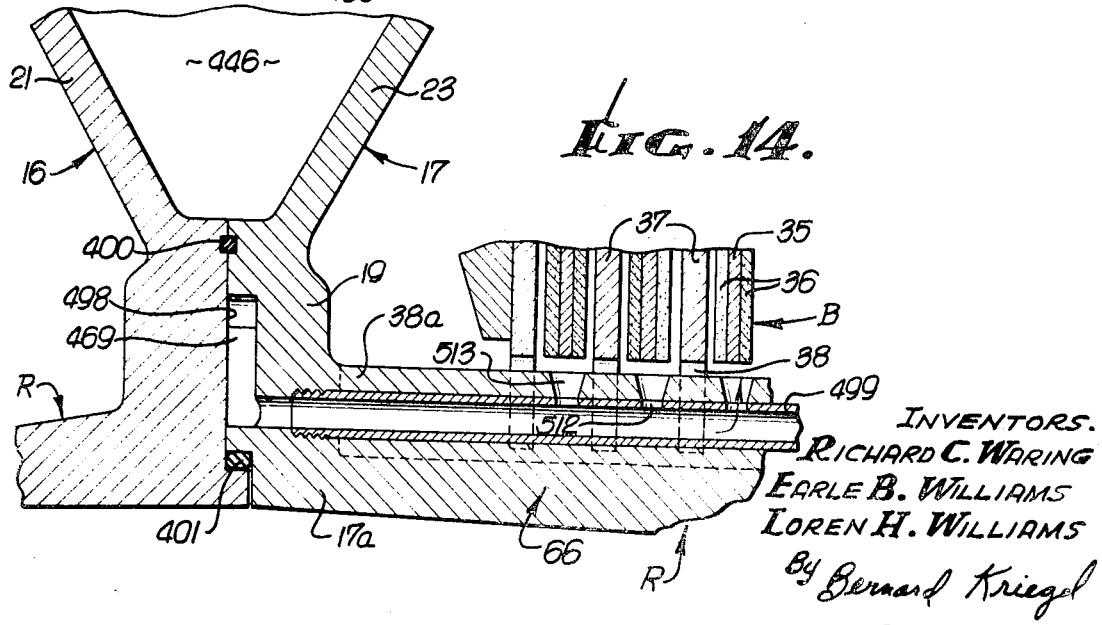
FIG. 14 is a section taken on the line 14—14 of FIG. 12, and showing the exhaust of the expansion chamber in the region of the brake discs.

In FIGS. 12 through 14, still another form of the invention is illustrated. Here again, the wheel assembly R and the brake assembly B are essentially the same as in the other embodiments, the reservoir 446 being defined between the outboard and inboard sections 16 and 17. However, in lieu of providing a separate tank for the coolant gas, the outboard and inboard sections 16 and 17 are provided with appropriate sealing means, such as sealing rings 400 and 401 which, as seen in FIGS. 13 and 14, are interposed at the contacting surface of the sections 16, 17. It will be understood that other seals may be employed where necessary or desirable to be sure that the annular space defined between the central portions 21 and 23 of the wheel rim will be adapted to contain a quantity of a pressurized coolant gas. In addition, an appropriate filler means may be provided, such as the filler 261 shown in FIG. 10.

As in the previous embodiment, there is a splined connection 38 between the rotor discs 37 and the cleats 38a of the rim 17a, a splined connection also being provided between the stator discs 35 and the stator body (as shown in FIG. 2). The valve 65, in this embodiment, and the expansion chamber 66 are disposed in side-by-side relation in the cleats 38a of the splined connections 38. Sets of the valve mechanism 65 and expansion chamber 66 are arranged around the wheel assembly.

Referring to FIG. 13, each thermal responsive valve mechanism 65 will be seen to comprise a poppet valve 467 having a stem 468 reciprocable in a bore 469 provided in the flange 19 of the section 17 and leading into the reservoir or tank 446. The valve 467 includes a head 471 engageable with a conical valve seat 473. A spring 474 engages the valve heat 471 to bias the valve 467 to closed position, the spring bearing against a support 476 and surrounding a stem section 475 slidably disposed in the support 476, which extends from a bracket 478 secured by fasteners 479 to the inside wall of the center portion 23 of the wheel section 17.

Each actuator 481 is slidably disposed in a reduced diameter bore 482 of the wheel section 17, a spring 485 acting at one end on an actuator flange 486, its other end abutting a bushing 485a to bias the actuator to the right, as seen in FIG. 13. The actuator 481 has an inclined or cam face 487 engageable with the end 488 of the valve stem 468, whereby movement of the actuator 481 to the left, as seen in FIG. 13, will shift the valve 467 from its seat 473 to open position.

Such movement of each actuator 481 is accomplished by an expansion rod 492, of Delrin or the like, which, as previously described, has a high coefficient of expansion, to effect actuation of its valve mechanism 65 in response to the friction heat developed by the brake B. As in the previously described embodiment, an adjuster screw 495 and locknut 496 arrangement determines the effective valve actuating temperature of the expansion rod 492.

The expansion chamber 66 of each set includes an inlet passage 498 communicating with the valve bore 469 in which the valve stem 468 is reciprocable. A tube 499 (FIG. 14) extends through the cleats 38a of the splined connections 38 and has a closed end (not shown) and a number of lateral ports 512 communicating with aligned ports 513 in the cleats 38a, so that the gas discharges against the rotor and stator discs of the brake assembly B. The compressed gas expands in discharging through the ports 512, 513, its temperature dropping drastically, so that the gas sprayed upon the brake discs produces a direct cooling effect thereon.

We claim:
1. In a wheel and brake assembly having a wheel, an axle rotatably supporting said wheel, brake rotor means connected to said wheel for rotation therewith, brake stator means connected to said axle, and means for applying pressure to effect coengagement of said rotor and said stator means: cooling means for said assembly including a reservoir for a pressurized coolant having a gaseous state, means for effecting expansion of gas from said reservoir to cool at least a portion of said assembly, and thermal-responsive means for controlling the flow of gas from said reservoir to said expansion means in response to the heat generated by coengagement of said rotor and stator means, said brake rotor means including a number of circumferentially spaced cleats on said wheel, a number of discs having lugs slidably engaged with said cleats, said expansion means comprising a plurality of circumferentially spaced expansion chambers each including a bore in one of said cleats, a tube in said bore having lateral ports for allowing the expansion of gas into said bore, said bore having a ported plug at one end supporting an end of said tube.

2. In a wheel and brake assembly having a wheel, an axle rotatably supporting said wheel, brake rotor means connected to said wheel for rotation therewith, brake stator means connected to said axle, and means for applying pressure to effect coengagement of said rotor and said stator means: cooling means for said assembly including a reservoir for a pressurized coolant having a gaseous state, means for effecting expansion of gas from said reservoir to cool at least a portion of said assembly, and thermal responsive means for controlling the flow of gas from said reservoir to said expansion means in response to the heat generated by coengagement of said rotor and stator means, said brake rotor means including a number of circumferentially spaced cleats on said wheel, a number of discs having lugs slidably engaged with said cleats, said expansion means comprising expansion chambers disposed in said cleats, said control means including a valve chamber communicating with an expansion chamber, a valve for shutting off such communication, an actuator rod having a high coefficient of thermal expansion for opening said valve, and adjuster means for adjusting the relationship between said valve and said rod.

3. In a wheel and brake assembly having a rotatable wheel, an axle rotatably supporting said wheel, brake rotor means connected to said wheel for rotation therewith, brake stator means connected to said axle, and means for applying pressure to effect coengagement of said rotor and said stator means: cooling means for said assembly including a reservoir for a pressurized coolant having a gaseous state, said reservoir being carried by said wheel to rotate therewith, means on said wheel for effecting expansion of gas from said reservoir to considerably reduce the temperature of the gas and cool at least a portion of said wheel, and thermal-responsive means on said wheel for controlling the flow of gas from said reservoir to said expansion means in response to the heat generated by coengagement of said rotor and stator means.

4. In a wheel and brake assembly as defined in claim 3, said thermal responsive means comprising a valve, and actuator means for said valve including a straight rod having a high coefficient of thermal expansion, said rod expanding to open said valve in response to the heat of friction generated by said brake means.

5. In a wheel and brake assembly as defined in claim 3, said brake rotor means including a number of discs having a splined connection with said wheel, said expansion means comprising a plurality of circumferentially spaced expansion chambers extending along said splined connection.

6. In a wheel and brake assembly as defined in claim 3, said brake rotor means including a number of circumferentially spaced cleats on said rim portion of said wheel, a number of discs having lugs slidably engaged with said cleats, said expansion means comprising a plurality of circumferentially spaced expansion chambers each including a bore in one of said cleats, a tube in said bore having lateral ports for allowing the expansion of gas into said bore.

7. In a wheel and brake assembly as defined in claim 3, said brake rotor means including a number of circumferentially spaced spline portions on said wheel, a number of discs having lugs slidably engaged with said spline portions, said expansion means and said control means each being disposed in one of said spline portions.

8. In a wheel and brake assembly as defined in claim 3, said brake rotor means including a number of circumferentially spaced cleats on said wheel, a number of discs having lugs slidably engaged with said cleats, said expansion means comprising an expansion chamber, said chamber and said control means each being disposed in one of said cleats, said control means including a valve chamber communicating with said expansion chamber, a valve for shutting off such communication, and an actuator rod having a high coefficient of thermal expansion for opening said valve.

9. In a wheel and brake assembly as defined in claim 3, said brake rotor means including a number of circumferentially spaced cleats on said wheel, a number of discs having lugs slidably engaged with said cleats, said expansion means comprising expansion chambers disposed in said cleats, said control means including a valve chamber communicating with an expansion chamber, a valve for shutting off such communication, and an actuator rod having a high coefficient of thermal expansion for opening said valve.

10. In a wheel and brake assembly as defined in claim 3, said brake rotor means including a number of circumferentially spaced cleats on said wheel, a number of discs having lugs slidably engaged with said cleats, said expansion means comprising expansion chambers disposed in said cleats, said control means including a valve chamber communicating with an expansion chamber, a valve for shutting off such communication, an actuator rod having a high coefficient of thermal expansion for opening said valve, said valve having a stem, an actuator member between said rod and said stem, said actuator member and said stem having contacting portions including an inclined surface for shifting said valve upon movement of said actuator member in one direction to open said valve, and said rod being engaged with said actuator member to shift the same in said one direction in response to thermal expansion of said rod.

11. In a wheel and brake assembly as defined in claim 3, said brake rotor means including a number of circumferentially spaced cleats on said wheel, a number of discs having lugs slidably engaged with said cleats, said expansion means comprising expansion chambers disposed in said cleats, said control means including a valve chamber communicating with an expansion chamber, a valve for shutting off such communication, and an actuator rod having a high coefficient of thermal expansion for opening said valve, said valve having a stem, an actuator member between said rod and said stem, said actuator member and said stem having contacting portions including an inclined surface for shifting said valve upon movement of said actuator member in one direction to open said valve, said rod being engaged with said actuator member to shift the same in said one direction responsive to thermal expansion of said rod, and a spring acting on said actuator member to shift the same in the opposite direction.

12. In a wheel and brake assembly as defined in claim 3, said brake rotor means including a number of circumferentially spaced cleats on said wheel, a number of discs having lugs slidably engaged with said cleats, said expansion means comprising expansion chambers disposed in said cleats, said control means including a valve chamber communicating with an expansion chamber, a valve for shutting off such communication, actuator rod having a high coefficient of thermal expansion for opening said valve, said valve having a stem, an actuator member between said rod and said stem, said actuator member and said stem having contacting portions including an inclined surface for shifting said valve upon movement of said actuator member in one direction to open said valve, and said rod being engaged with said actuator member to shift the same in said one direction responsive to thermal expansion of said rod, a spring acting on said actuator member to shift the same in the opposite direction, and a spring acting on said valve to close the same upon shifting of said actuator member in said opposite direction.

13. In a wheel and brake assembly as defined in claim 3, said brake rotor means including a number of circumferentially spaced spline portions on the rim of said wheel, a number of discs having lugs slidably engaged with said spline portions, said expansion means comprising an expansion chamber, said expansion chamber and said control means each being disposed in one of said spline portions, said control means including a valve chamber communicating with said expansion chamber, a valve for shutting off such communication, and an actuator rod having a high coefficient of thermal expansion for opening said valve.

14. In a wheel and brake assembly as defined in claim 3, said brake rotor means including a number of circumferentially spaced cleats on said wheel, a number of discs having lugs slidably engaged with said cleats, said expansion means comprising an expansion chamber, said expansion chamber and said control means each being disposed in one of said cleats, said control means including a valve chamber communicating with an expansion chamber, a valve for shutting off such communication, and an actuator rod having a high coefficient of thermal expansion for opening said valve, said valve having a stem, an actuator member between said rod and said stem, said actuator member and said stem having contacting portions including an inclined surface for shifting said valve upon movement of said actuator member in one direction to open said valve, and said rod being engaged with said actuator member to shift the same in said one direction in response to thermal expansion of said rod.

15. In a wheel and brake assembly as defined in claim 3, said brake rotor means including a number of circumferentially spaced cleats on said wheel, a number of discs having lugs slidably engaged with said cleats, said expansion means comprising an expansion chamber, said expansion chamber and said control means each being disposed in one of said cleats, said control means including a valve chamber communicating with an expansion chamber, a valve for shutting off such communication, and an actuator rod having a high coefficient of thermal expansion for opening said valve, said valve having a stem, an actuator member between said rod and said stem, said actuator member and said stem having contacting portions including an inclined surface for shifting said valve upon movement of said actuator member in one direction to open said valve, said rod being engaged with said actuator member to shift the same in said one direction in response to thermal expansion of said rod, and a spring acting on said actuator member to shift the same in the opposite direction.

16. In a wheel and brake assembly as defined in claim 3, said brake rotor means including a number of circumferentially spaced cleats on said wheel, a number of discs having lugs slidably engaged with said cleats, said expansion means comprising an expansion chamber, said expansion chamber and said control means each being disposed in one of said cleats, said control means including a valve chamber communicating with an expansion chamber, a valve for shutting off such communication, and an actuator rod having a high coefficient of thermal expansion for opening said valve, said valve having a stem, an actuator member between said rod and said stem, said actuator member and said stem having contacting portions including an inclined surface for shifting said valve upon movement of said actuator member in one direction to open said valve, said rod being engaged with said actuator member to shift the same in said one direction in response to thermal expansion of said rod, a spring acting on said actuator member to shift the same in the opposite direction, and a spring acting on said valve to close the same upon shifting of said actuator member in said opposite direction.

17. In a wheel and brake assembly as defined in claim 3, said brake rotor means including a number of circumferentially spaced cleats on said wheel, a number of discs having lugs slidably engaged with said cleats, said expansion means comprising an expansion chamber, said expansion chamber and said control means each being disposed in one of said cleats, said expansion chamber including a bore in one of said cleats, said control means including a valve having a stem extending through said bore, an actuator rod reciprocable in said wheel in parallel spaced relation to said bore, said rod having a high coefficient of thermal expansion, and a rocker arm engaged with an end of said rod and with said stem to open said valve upon expansion of said rod.

18. In a wheel and brake assembly as defined in claim 3, said brake rotor means including a number of circumferentially spaced cleats on said wheel, a number of discs having lugs slidably engaged with said cleats, said expansion means comprising an expansion chamber, said expansion chamber and said control means each being disposed in one of said cleats, said expansion chamber including a bore in one of said cleats, said control means including a valve having a stem extending through said bore, an actuator rod reciprocable in said wheel in parallel spaced relation to said bore, said rod having a high coefficient of thermal expansion, a rocker arm engaged with an end of said rod and with said stem to open said valve upon expansion of said rod, and spring means acting on said valve to close the same upon contraction of said rod.

19. In a wheel and brake assembly as defined in claim 3, said brake rotor means including a number of circumferentially spaced spline portions on the rim of said wheel, a number of discs having lugs slidably engaged with said spline portions, said expansion means comprising circumferentially spaced expansion chambers disposed in said spline portions, said control means including a valve chamber communicating with an expansion chamber, a valve for shutting off such communication, and an actuator rod having a high coefficient of thermal expansion for opening said valve, said valve having a stem, an actuator body, said stem having an end extending into said actuator body, said rod being disposed in said actuator body and engaged with the end of said stem.

20. In a wheel and brake assembly as defined in claim 3, said brake rotor means including a number of circumferentially spaced cleats on said wheel, a number of discs having lugs slidably engaged with said cleats, said expansion means comprising circumferentially spaced expansion chambers disposed in said cleats, said control means including a valve chamber communicating with an expansion chamber, a valve for shutting off such communication, an actuator rod having a high coefficient of thermal expansion for opening said valve, said valve having a stem, an actuator body, said stem having an end extending into said actuator body, said rod being disposed in said actuator body and engaged with an end of said stem, and a spring in said actuator body acting on said stem to close said valve.

21. In a wheel and brake assembly as defined in claim 3, said brake rotor means including a number of circumferentially spaced cleats on said wheel, a number of discs having lugs slidably engaged with said cleats, said expansion means comprising circumferentially spaced expansion chambers disposed in said cleats, said valve means including a valve chamber communicating with an expansion chamber, a valve for shutting off such communication, and an actuator rod having a high coefficient of thermal expansion for opening said valve, said expansion chambers each comprising a tube extending through a cleat, said tube and said cleat having ports opening laterally inwardly for discharge of the coolant gas upon said discs.

22. In a wheel and brake assembly as defined in claim 3, said reservoir comprising a tank connected to said wheel assembly, said control means including a valve passage leading between said tank and said expansion means.

23. In a wheel and brake assembly as defined in claim 3, said wheel having portions comprising said reservoir, and said control means including a valve passage leading between said reservoir and said expansion means.

24. In a wheel and brake assembly as defined in claim 3, said wheel having center portions defining an annular space therebetween, sealing means for closing said annular space, said reservoir being constituted by said annular space, and said control means including a valve passage in said wheel leading from said annular space to said expansion means.

25. In a wheel and brake assembly as defined in claim 3, said wheel having center portions defining an annular space therebetween, sealing mean for closing said annular space, said reservoir being constituted by said annular space, said control means including a valve passage in said wheel leading from said annular space to said expansion means, said brake rotor means including a number of discs, splines on said discs and on said wheel connecting said discs to said wheel, and said expansion means comprising tubes connected to said valve passage and extending through said splines.

26. In a wheel and brake assembly as defined in claim 3, said wheel having center portions defining an annular space therebetween, sealing means for closing said annular space, said reservoir being constituted by said annular space, said control means including a valve passage in said wheel leading from said annular space to said expansion means, said brake rotor means including a number of discs, splines on said discs and on said wheel connecting said discs to said wheel, and said expansion means comprising tubes connected to said valve passage and extending through said splines, said tubes having ports opening laterally therefrom to direct coolant gas toward said discs.

* * * * *